United States Patent Office 3,345,190
Patented Oct. 3, 1967

3,345,190
METHOD FOR CONTROLLING THE REDUCTION OF METALLIC IONS IN GLASS COMPOSITIONS
Marvin J. Albinak and Warren H. Turner, Toledo, Ohio, assignors to Owens-Illinois, Inc., a corporation of Ohio
No Drawing. Filed Dec. 4, 1963, Ser. No. 328,097
20 Claims. (Cl. 106—47)

ABSTRACT OF THE DISCLOSURE

A method for controlling and maintaining uniformity of color in glass compositions and articles to avoid uncontrolled reduction of the metallic coloring ions in the glass to the free metal state. This is accomplished by adding to the glass composition as the sole additive to control the oxidation state of the metallic colorant ions, oxalate salts of a metal selected from the group consisting of Group Ia metals and Group IIa metals of the Periodic Table. Illustrative of suitable oxalates are magnesium oxalate, barium oxalate, cesium oxalate, potassium oxalate, sodium and calcium oxalate. Usually sodium or calcium oxalates are preferred for this purpose. Metal oxalates added to the glass batch function as reducing agents which reduce the metallic ions of the various metallic compounds including the metallic colorant compounds to the desired state of oxidation in a controllable manner so as to avoid the problems of "striking" or "browning" of the glass composition.

---

The present invention relates to novel methods for controlling the reduction of selected components in glass compositions, and more particularly, to a method for controlling the reduction of selected metallic ions in the preparation of glass compositions so as to prevent undesirable discoloration of the final glass compositions.

Glass compositions can be prepared from a considerable variety of base glass compositions such as soda-lime glass, barium crown glass and the like, and may include a large number of different types of colorants. Depending on the nature of the colorant or activator a variety of effects in the glass can be produced. For example, copper-ruby glass can be made by adding the proper copper compound to the glass batch.

Fluorescent and luminescent glasses can likewise be prepared by selecting suitable metallic compounds, those of the lanthanide series in the Periodic Table being particularly suited for this purpose. As used hereinafter the expression "metallic colorant compound" will be intended to include all these substances that are added to glass to produce a coloring, luminescence or fluorescent effect.

Glasses containing one or more of these selected metallic colorant compounds have been made for years past using conventional glass batch formulas including a reducing agent. Among the most common of the reducing agents employed heretofore are charcoal, sugars, cream of tartar, carbon, and the like. With these reducing agents, difficulties are encountered in controlling and maintaining uniformity of color since their use requires that the glass be melted under carefully controlled furnace conditions and, even then, the results are not completely satisfactory. The agents previously employed are strong in their reducing action and tend to rapidly and completely reduce the metallic ions of the metallic colorant compound to the free metal state. The rapid reducing action of these materials is largely responsible for the unsatisfactory results obtained, primarily a deviation in the ultimate color sought to be formed in the glass.

The color of glass is frequently determined by the state of oxidation of the metallic ions therein. For example, copper ions in the cupric state, i.e., $Cu^{+2}$, exhibit a blue color in glass compositions, whereas copper ions in the cuprous state, i.e. $Cu^{+1}$ are colorless and copper in the free metal state is red. Thus, the oxidation state of the metallic ions is a critical factor in the production of colored glasses. If a light blue colored glass or a colorless glass is necessary for a particular purpose, the use of a rapid, strong reducing agent whereby the copper ions tend to be reduced to the free metal state would result in a glass having a color different than that desired.

Under these conditions it is often extremely difficult to obtain the proper color in a glass composition containing metallic ions when a strong reducing agent is employed which rapidly acts to reduce the metallic ions completely to the free metal state, and glass of such a desired color must be very carefully prepared.

Accordingly, it is the object of the present invention to avoid the disadvantages of the prior known methods and compositions for reducing metallic compounds in glass compositions.

It is a further object of the present invention to provide a method for controlling the reduction of the metallic ions in a glass composition so as to more accurately control the formation of the desired color in the glass.

It is a further object of the present invention to provide a method for introducing a major metal oxide component into the glass composition and at the same time, controlling the reduction of the metallic colorant ions present in the glass composition.

It is a further object of the present invention to provide a method for avoiding undesirable discoloration of glass compositions caused by the rapid reduction of the metallic ions.

It is the further object of the present invention to provide a method for controlling the ultimate color of glass compositions containing metallic colorant compounds.

In attaining the above objects a feature of the present invention resides in the use of an oxalate salt that acts as a strong reducing agent but permits accurate control of the reduction of metallic ions in a glass composition.

A further feature resides in the use of metal oxalate salt wherein the salt controls the reduction of the metallic ions in a molten base glass composition while the metal forms an oxide which is an important part of the final base glass composition.

Still another feature resides in the use of a metal oxalate which when present in a molten glass composition, emits carbon dioxide gas in the form of bubbles which increase the mixing and refining of the glass forming ingredients and provide a glass having a uniform color throughout.

These objects and features as well as others will become apparent from the following detailed description of the invention.

It has now been discovered that by employing a particular metal oxalate salt as the reducing agent in the preparation of glass compositions containing metallic colorant compounds the reduction of the metallic ions can be controlled and undesirable and excessive reduction can be avoided. The use of the particular metal oxalate as the reducing agent enables accurate control and maintenance of color uniformity in glass composition not possible heretofore. According to the methods of the present invention the difficulties caused by the rapid and complete reduction of metallic ions substantially to the free metal state are considerably lessened and, in most instances, overcome. The problem confronted by glass manufacturers wherein discoloration occurred, thus making the glass no longer suitable for its intended purpose, has now been overcome and the cause of the discoloration due to rapid reduction of the metallic ions has been eliminated.

The metal oxalate salts that can be employed as the reducing agent for glass compositions according to the present invention include the oxalate salts of a metal selected from the group consisting of Group Ia metals and Group IIa metals in the Periodic Table according to Mendeléeff. Illustrative examples of these metals are magnesium, barium, cesium, potassium, sodium and calcium. The latter two metals are most usually preferred.

The meal oxalate salt is added to the glass batch for the preparation of the final glass composition and functions in several ways. Its most important function is as a reducing agent which reduces metallic ions of the various metallic compounds including the metallic colorant compounds to the desired state of oxidation in a slow, controllable manner without encountering the problem of "striking" or "browning" of the glass composition. Thus, reduction of the metallic ions to an undesirable oxidation state which would cause discoloration of the base glass is avoided.

The second function of the metal oxalate salt is to provide a portion of the alkaline earth or alkali metal oxide content of the glass composition. Up to 100% by weight of the final alkaline earth metal oxide or alkali metal oxide content of the glass composition can be added in the form of the appropriate oxalate. As a minimum, however, sufficient oxalate is added to provide the necessary reducing power and to avoid undesirable discoloration and reduction to an undesirable state of oxidation. The specific proportions of the oxalate added will vary over considerable ranges depending upon the nature of the reducible metallic ions, final glass composition, etc. Generally, the oxalate will be added in an amount of up to about 20–25% of the total batch weight of the glass forming composition although greater amounts can be used.

The third function of the oxalate salt is that of a mixing and refining agent, and is due to the liberation of carbon dioxide gas. Carbon dioxide gas is generated when the salt is incorporated into the molten glass composition. The gas rising out of the molten mixture in the form of bubbles gives an excellent mixing or fluxing action to the composition and insures a homogeneous and uniform glass composition.

The simultaneous action of reducing the metallic ions, providing a portion of the metal oxide content and mixing to produce a uniform glass composition constitutes an important feature of the present invention.

The metallic ions of the colorant compounds in the molten base composition are particularly susceptible to rapid and complete reduction by the strong reducing agents used heretofore. The excessive reduction of these metallic ions causes problems in control of color and transmission of light and deleteriously affects the final glass products such as bottles, jars, lighting fixtures, rendering them unfit for their intended purposes.

The metallic ions present in the glass composition are the coloring and luminescence-producing ingredients sometimes also referred to as "doping agents" or activators which are added to the base glass composition for various purposes. For example, in copper-ruby glass, copper oxide is employed as a means for absorbing ultraviolet light and preventing the degradation of the contents of the container. However, when normal reducing agents are introduced in the glass composition, they tend to reduce the copper to the free metal state which produces a very dark brown or black opaque glass unattractive and unsaleable for packaging many consumer products.

Included among the metallic colorant ions that have been employed for various purposes in glass compositions in the past and which can be employed for purposes of the present invention are Fe (III); V (V); Cu (II); Cr (VI); Mo (VI).

The following elements have been used as colorants or fluorescent activators in soda-lime glass: copper oxide, molybdenum oxide, iron oxide, chromium oxide, titanium oxide, vanadium oxide.

The foregoing are given merely by way of illustration and it is understood that the invention is applicable to other base glass compositions employing one or more of the above colorants or one or more other colorants, activators, doping agents and the like all of which are referred to herein as metallic colorant compounds.

The amount of metal oxalate that is employed for purposes of the present invention can be varied over a wide range and depends in part upon the amount of the alkali metal oxide or alkaline earth metal oxide present in the final glass composition. Up to 100% of the alkali metal oxide or alkaline earth metal oxide content of the final glass composition can be added in the form of the respective metal oxalate. For example, when an alkali metal free glass is desired, the oxalate could be added in the form of an alkaline earth metal oxalate, e.g. calcium oxalate.

As is apparent from the foregoing, the invention is suitable for a wide variety of glass compositions including soda-lime glass, barium-crown glass, soda-zinc aluminosilicate glass and silicate glasses in general. The invention is particularly suitable for glasses wherein the problem of "striking" or "browning" is particularly acute with the prior known methods involving addition of strong, rapidly acting reducing agents.

The following examples will serve to illustrate the present invention but are not considered limiting thereof.

Example I

A glass batch of the following composition was melted:

| | Grams |
|---|---|
| Kona Quintas quartz | 128.8 |
| Alumina | 3.14 |
| $BaCO_3$ | 43.74 |
| $K_2CO_3$ | 26.66 |
| $BaSO_4$ | 1.22 |
| $B_2O_3$ | 4.40 |
| CuO | 1.63 |
| $Na_2CO_3$ | 15.74 |

The above batch was divided into four portions.

(a) With the first batch, 1 gram of carbon was added as a reducing agent and a brown copper amber glass was produced.

(b) With the second portion, three grams of carbon were added which resulted in a black opaque copper amber glass which was unsuitable for the intended purpose.

(c) With the third portion, all of the sodium carbonate was replaced by sodium oxalate and a pale blue copper color was obtained. This represented a successful attractive glass composition.

(d) With the fourth portion, one-half of the $Na_2O$ was supplied by sodium oxalate and the remainder was sodium carbonate and medium blue copper color was obtained which likewise was very satisfactory.

Example II

Using the same glass batch as defined in Example I the following tests were carried out:

The barium sulfate was entirely omitted because the carbon acts to reduce the sulfate to an amber color. The glass batch was divided into four portions.

(a) With the first portion, no reducing agent was added and a dark blue copper color was obtained.

(b) Using 1 gram of carbon as the reducing agent, a copper ruby glass was produced which was entirely struck, that is, discolored to the point where it was no longer suitable for its intended purpose such as jars, bottles, etc. for consumer products.

(c) To the third portion three grams of carbon were added as a reducing agent and the resulting glass was completely opaque and therefore unsatisfactory.

(d) With the fourth portion, one-half of the sodium oxide content was added in the form of sodium oxalate and an extremely pale blue color was obtained which represented a satisfactory color.

*Example III*

A soda-lime glass of the following composition was melted:

|  | Grams |
|---|---|
| $SiO_2$ | 71.19 |
| $Al_2O_3$ | 1.41 |
| CaO | 11.71 |
| MgO | 2.67 |
| $Na_2O$ | 13.02 |

The above melt was evenly divided into individual batches and the following elements were incorporated into each glass batch as colorants or fluorescent activators. The amount of element was 1% by weight (a) Copper oxide
(b) Molybdenum oxide
(c) Iron oxide
(d) Chromium oxide
(e) Titanium oxide
(f) Vanadium oxide Sodium oxalate was added to the glass batch to provide one-half by weight of the sodium oxide content of the soda-lime glass. All of the glasses exhibited excellent coloration and fluorescence properties.

*Example IV*

A soda-zinc-aluminosilicate glass of the following composition was melted:

|  | Percent |
|---|---|
| $Na_2O$ | 11 |
| ZnO | 15 |
| $Al_2O_3$ | 9 |
| $SiO_2$ | 65 |

Sodium oxalate was used as the reducing and fluxing agent. A series of samples were made and the following elements were each used as activator colorants.

(a) Cerium oxide
(b) Copper oxide
(c) Manganese oxide
(d) Silver oxide
(e) Samarium oxide
(f) Europium oxide
(g) Tin oxide
(h) Terbium oxide
(i) Uranium oxide The elements were added in an amount of approximately 1% by weight and all of the resulting glass compositions exhibited excellent properties. Typical colors observed with a few of the metal oxides were:
  Copper—Very light blue to colorless.
  Manganese—Colorless.

*Example V*

A soda-lime glass having the following composition was melted and divided into individual batch compositions.

|  | Percent |
|---|---|
| $SiO_2$ | 70 |
| $Al_2O_3$ | 2 |
| CaO | 12 |
| MgO | 3 |
| $Na_2O$ | 12 |

A series of samples were made employing each of the following combinations of colorants and fluorescent activators in the amount of 1% by weight. Sodium oxalate was added to provide one-half by weight of the $Na_2O$ content.

Tin oxide+copper oxide
Tin oxide+samarium oxide
Tin oxide+terbium oxide
Tin oxide+chromium oxide
Tin oxide+cerium oxide
Tin oxide+titanium oxide
Tin oxide+praseodymium oxide
Tin oxide+samarium oxide+copper oxide
Copper oxide+samarium oxide.

The foregoing examples serve as illustrations of the wide applicability of the present invention. It is thus particularly useful because of the considerable number of different glasses and colorants that exist. The present invention as fully described supra, provides a method for avoiding undesirable discolorations caused by rapid reduction of the metallic ions in the glass composition to the free metal, while simultaneously adding at least a portion of a major component of the glass composition such as alkali metal oxide or alkaline earth metal oxide to the batch with accompanying fluxing to produce uniform and homogeneous glass compositions.

What is claimed is:

1. In the preparation of glass compositions containing metallic compounds wherein previously employed reducing agents in the molten glass compositions tend to rapidly and completely reduce the metallic ions of the said metallic compounds to the free metal state, and thereby cause a discoloration and deterioration of the glass composition, the improvement whereby the oxidation state of the metallic ions of the said metallic compounds is controlled and discoloration of the glass composition is avoided, which comprises having in the molten glass composition, as the sole additive for controlling the oxidation state of said metallic ions, a metal oxalate salt wherein the metal is a member selected from the group consisting of Group Ia metals and Group IIa metals of the Periodic Table, said salt being present in an amount sufficient to permit said metallic compound to produce the desired color in the base glass composition.

2. The preparation of glass compositions as defined in claim 1, wherein the amount of said metal oxalate salt present is sufficient to yield up to about 100% of the total amount of respective metal oxide present in the final glass composition.

3. The preparation of glass compositions as defined in claim 2 wherein said metal oxalate salt is sodium oxalate.

4. The preparation of glass compositions as defined in claim 2 wherein said metal oxalate salt is calcium oxalate.

5. In the preparation of glass compositions containing metallic colorant compounds, wherein the addition of previously employed strong reducing agents tends to rapidly and completely reduce the metallic ions of the said metallic colorant compounds to the free metal state, and thereby cause a discoloration and deterioration of the glass batch composition, the improvement whereby the oxidation state of the metallic colorant compound is controlled and discoloration of the glass composition is avoided, which comprises adding to the base glass composition, as the sole additive for controlling the oxidation state of said metallic ions, a sufficient amount of a metal oxalate salt wherein the metal is a member selected from the group consisting of Group Ia metals and Group IIa metals of the Periodic Table.

6. The preparation of glass compositions as defined in claim 5 wherein said metal oxalate salt is present in an amount of from 20–25% of the total batch composition.

7. A method as defined in claim 5 wherein the metal oxalate is added in an amount to provide up to 100% by weight of the respective metal oxide present in the final glass composition.

8. In a glass composition wherein the incorporation of strong reducing agents tends to rapidly and completely reduce the metallic ions of the metallic compounds in the glass composition to the free metal state thereby producing undesirable discoloration and deterioration of the said metallic compounds, the improvement whereby the oxidation state of the said metallic ions is controlled to avoid undesirable discoloration, and which comprises adding to the glass, as the sole additive for controlling the oxidation state of the said metallic ions, a metal oxalate salt wherein the metal is selected from the group consisting of Group Ia and Group IIa metals.

9. In the glass composition as defined in claim 8 wherein the metal oxalate is added in an amount sufficient to yield up to 100% by weight of the respective metal oxide component of the final glass composition.

10. In the base glass composition as defined in claim 8 wherein the oxalate salt is sodium oxalate.

11. In the base glass composition as defined in claim 8 wherein the oxalate salt is calcium oxalate.

12. In a copper-ruby glass composition wherein the incorporation of strong reducing agents tends to rapidly reduce the metallic ions of the colorant compounds of the glass composition to the free metal state thereby producing undesirable discoloration and deterioration of the glass composition, the improvement whereby the oxidation state of the said metallic ions is controlled to avoid undesirable discoloration and which comprises adding to the base glass as the sole reducing agent a metal oxalate salt wherein the metal is selected from the group consisting of Group Ia and Group IIa metals from the Periodic Table, in an amount sufficient to yield up to 100% by weight of the respective metal oxide component of the final glass composition.

13. In a soda-lime glass composition containing metallic compounds which affect the color of the glass and wherein the incorporation of strong reducing agents tends to rapidly reduce the metallic ions of the said metallic compounds to the free metal state thereby producing undesirable discoloration of the glass, the improvement whereby the rate of reduction and the oxidation state of the said metallic ions are controlled to avoid undesirable discoloration, and which comprises adding to the soda-lime glass composition as the sole reducing agent a metal oxalate salt wherein the metal is selected from the group consisting of Group Ia and Group IIa metals from the Periodic Table, in an amount sufficient to yield up to 100% by weight of the respective metal oxide component of the final glass composition.

14. In the soda-lime glass composition as defined in claim 13 wherein the metal oxalate salt is sodium oxalate.

15. In the soda-lime glass composition as defined in claim 13 wherein the metal oxalate salt is calcium oxalate.

16. A method for chemically reducing selected metallic components in glass compositions which in the presence of strong reducing agents tend to be rapidly and completely reduced to the free metal state, comprising adding to the base glass composition containing the selected metallic compounds as the sole reducing agent a metal oxalate salt wherein the metal is a member selected from the group consisting of Group Ia metals and Group IIa metals of the Periodic Table, thereby providing a portion of the metal oxide content of the final glass composition while simultaneously substantially lessening the tendency of the said selected metallic component to be rapidly and completely reduced to the free metal state and avoiding undesirable discoloration of the final glass composition.

17. The method of chemically reducing selected metallic components in glass compositions as defined in claim 16 wherein said glass composition is a soda-lime glass composition.

18. A method for avoiding undesirable discoloration in the preparation of glass compositions caused by incorporating into the said glass composition a strong reducing agent which tends to rapidly reduce the metallic ions of selected metallic compounds in the glass composition to the free metal state, which method comprises adding to the glass composition as the sole reducing agent a metal oxalate salt wherein the metal is a member selected from the group consisting of Group Ia and Group IIa metals of the Periodic Table, thereby providing a portion of the metal oxide content of the final glass composition while substantially avoiding undesirable reduction of the metallic ions to the free metal state.

19. A method as defined in claim 18 wherein the metal oxalate salt is sodium oxalate.

20. A method as defined in claim 18 wherein the metal oxalate salt is calcium oxalate.

References Cited
UNITED STATES PATENTS

| | | | |
|---|---|---|---|
| 2,688,559 | 9/1954 | Armistead | 106—52 |
| 2,922,720 | 6/1957 | Parks | 106—52 |
| 3,032,428 | 5/1962 | Ginther | 106—47 |

HELEN M. McCARTHY, *Primary Examiner.*